(12) United States Patent  
Rhee (10) Patent No.: US 11,091,853 B2  
(45) Date of Patent: Aug. 17, 2021

(54) FIBER MANUFACTURING APPARATUS

(71) Applicant: SUFAB INC., Seoul (KR)

(72) Inventor: Jin Kyu Rhee, Seoul (KR)

(73) Assignee: SUFAB INC., Seoul (KR)

( * ) Notice: Subject to any disclaimer, the term of this patent is extended or adjusted under 35 U.S.C. 154(b) by 410 days.

(21) Appl. No.: 16/036,117

(22) Filed: Jul. 16, 2018

(65) Prior Publication Data

US 2019/0017194 A1    Jan. 17, 2019

(30) Foreign Application Priority Data

Jul. 14, 2017    (KR) .................. 10-2017-0089669

(51) Int. Cl.
| | |
|---|---|
| *D01D 5/00* | (2006.01) |
| *D01D 5/38* | (2006.01) |
| *D01D 10/04* | (2006.01) |
| *D01F 6/02* | (2006.01) |
| *D01D 7/00* | (2006.01) |
| *D01F 4/06* | (2006.01) |

(Continued)

(52) U.S. Cl.
CPC ............ *D01D 5/0076* (2013.01); *A23L 35/00* (2016.08); *D01D 5/00* (2013.01); *D01D 5/38* (2013.01); *D01D 7/00* (2013.01); *D01D 10/04* (2013.01); *D01F 4/06* (2013.01); *D01F 6/02* (2013.01); *A23J 3/227* (2013.01); *D10B 2201/00* (2013.01)

(58) Field of Classification Search
None
See application file for complete search history.

(56) References Cited

U.S. PATENT DOCUMENTS

| | | |
|---|---|---|
| 5,308,398 A | 5/1994 | Ottl et al. |
| 2006/0057375 A1 | 3/2006 | Harren et al. |

(Continued)

FOREIGN PATENT DOCUMENTS

| | | |
|---|---|---|
| JP | 5171562 A2 | 7/1993 |
| JP | 2006508265 A | 3/2006 |
| JP | 2006508265 T2 | 3/2006 |

(Continued)

OTHER PUBLICATIONS

KR Patent Application No. 10-2017-0089669 filed Jul. 14, 2017, Notice of Allowance dated Apr. 30, 2018, all pages, no English translation available.

(Continued)

*Primary Examiner* — Michael P. Rodriguez  
(74) *Attorney, Agent, or Firm* — Kilpatrick Townsend & Stockton LLP (57) ABSTRACT

A fiber manufacturing apparatus includes: a fiber manufacturing portion including a first operation unit including a first operation surface and a second operation unit including a second operation surface facing the first operation surface, wherein at least one of the first operation unit and the second operation unit performs a reciprocating motion to manufacture a fiber between the first operation surface and the second operation surface; and a fiber collecting portion configured to collect the fiber manufactured between the first operation surface and the second operation surface, wherein at least one of the first operation surface and the second operation surface includes a polymer solution.

16 Claims, 5 Drawing Sheets

(51) Int. Cl.
　　　*A23L 35/00*　　(2016.01)
　　　*A23J 3/22*　　(2006.01)

(56) References Cited

U.S. PATENT DOCUMENTS

2008/0241538 A1　10/2008　Lee et al.
2014/0079759 A1　3/2014　Patel et al.

FOREIGN PATENT DOCUMENTS

| JP | 2011214174 A | * | 10/2011 | | |
|---|---|---|---|---|---|
| JP | 2011214174 A | | 10/2011 | | |
| JP | 5171562 B2 | | 3/2013 | | |
| KR | 10-2006-0048009 A | | 5/2006 | | |
| WO | 2012/078472 A2 | | 6/2012 | | |
| WO | 2012078472 A2 | | 6/2012 | | |
| WO | WO-2012078472 A2 | * | 6/2012 | ............. | A61K 45/06 |

OTHER PUBLICATIONS

KR Patent Application No. 10-2017-0089669 filed Jul. 14, 2017, Office Action dated Jan. 2, 2018, all pages, no English translation available.
International Search Report for PCT/KR2018/007931 dated Mar. 12, 2019, all pages.
Lee Hoik et al.: "Handspinning Enabled Highly Concentrated Carbon Nanotubes with Controlled Orientation in Nanofibers", Scientific Reports, vol. 6, No. 1, Nov. 23, 2016, 8 pages.
Kei Watanabe et al.: "Fabrication of Uniaxially Aligned Poly(propylene) Nanofibers via Handspinning", Macromolecular Materials and Engineering, Mar. 11, 2011, pp. 568-573.
European Application No. 18832642 received an Extended European Search Report dated Jul. 2, 2021, 10 pages.

* cited by examiner

FIBER MANUFACTURING APPARATUS

CROSS-REFERENCE TO RELATED APPLICATION

This application claims the benefit of Korean Patent Application No. 10-2017-0089669, filed on Jul. 14, 2017, in the Korean Intellectual Property Office, the disclosure of which is incorporated herein in its entirety by reference.

BACKGROUND

1. Field

One or more embodiments relate to a fiber manufacturing apparatus.

2. Description of the Related Art

Generally, a fiber refers to a structural unit having a shape of a thin and long thread that forms an organ of a body in a biological field, and denotes a long, thin, and soft substance, such as cotton or wool. That is, a fiber is a solid substance, which is thin to an extent in which it is not possible to measure a diameter or a width thereof with the naked eye, while having a length equal to or greater than at least 100 times the diameter or the width. Also, a fiber has basic properties, such as rigidity, flexibility, and a spinning property, and secondary properties, such as a hygroscopic property, elasticity, and chemical stability.

The number of types of fibers that are currently used amounts to dozens, which are classified based on chemical composition, and physical and chemical properties, wherein the classification varies according to eras, countries, and researchers. For example, before synthetic fibers came into existence, fibers had been classified into three types including vegetable fibers, animal fibers, and mineral fibers. However, after the synthetic fibers, fibers have been classified into natural fibers and synthetic fibers.

Natural fibers denote fibers that are produced from nature in the form of fibers to be directly used as fibers. For example, a fiber, such as flax, etc., which is obtained from a vegetable, is referred to as a vegetable fiber. All of these kinds of fibers include cellulose in a chemical aspect, and thus, are also referred to as cellulose-based fibers.

Also, a fiber obtained from an animal is referred to as an animal fiber, and with its chemical property being protein, it is also referred to as a protein-based fiber. Fibers may be generated from vegetable protein. The property of a synthetic protein fiber is more similar to that of a natural animal fiber than that of a natural vegetable fiber, and that is because the property of a fiber is determined based on whether a compound included in the fiber is cellulose-based or protein-based, rather than whether the origin of the fiber is a vegetable or an animal.

The vegetable protein-based fiber may be used as a material of synthetic meat, which is a substitute for meat. According to the related art, the vegetable protein-based fiber may be manufactured using electro-spinning, or using a method whereby a polymer material is injected into a highly concentrated solution and the solution, into which the polymer material is injected, is stirred. However, these methods require specific equipment, such as an electric-spinning device, or incur large costs and take time.

SUMMARY

One or more embodiments include an apparatus for manufacturing a vegetable protein-based fiber using a tensile force.

Additional aspects will be set forth in part in the description which follows and, in part, will be apparent from the description, or may be learned by practice of the presented embodiments.

According to one or more embodiments, a fiber manufacturing apparatus includes: a fiber manufacturing portion including a first operation unit including a first operation surface and a second operation unit including a second operation surface facing the first operation surface, wherein at least one of the first operation unit and the second operation unit performs a reciprocating motion to manufacture a fiber between the first operation surface and the second operation surface; and a fiber collecting portion configured to collect the fiber manufactured between the first operation surface and the second operation surface, wherein at least one of the first operation surface and the second operation surface includes a polymer solution.

The at least one of the first operation unit and the second operation unit may be configured to accommodate the polymer solution inside thereof and discharge the accommodated polymer solution via the first operation surface or the second operation surface.

The fiber manufacturing apparatus may further include a polymer solution supply portion configured to supply the polymer solution to the at least one of the first operation surface and the second operation surface.

The polymer solution supply portion may further be configured to supply the polymer solution into the at least one of the first operation unit and the second operation unit.

The polymer solution supply portion may include: one or more reservoirs configured to store the polymer solution; and a solution pipe configured to guide the polymer solution from the one or more reservoirs into the at least one of the first operation unit and the second operation unit.

One or more via holes, through which the accommodated polymer solution is discharged, may be formed in the at least one of the first operation surface and the second operation surface.

At least one of the first operation unit and the second operation unit may further include a discharge member disposed on the first operation surface or the second operation surface and including a porous material.

The fiber collecting portion may be configured to move between the first operation unit and the second operation unit, when the first operation unit and the second operation unit are spaced apart from each other by a distance that is equal to or greater than a certain distance.

The fiber collecting portion may include a collecting surface on which the fiber is mounted, wherein the collecting surface is configured to move between the first operation unit and the second operation unit via a linear reciprocating motion.

The fiber collecting portion may include: a shaft member disposed apart from the fiber manufacturing portion by a certain distance; and one or more rotating members including a collecting surface on which the fiber is mounted and configured to rotate based on the shaft member to pass between the first operation unit and the second operation unit.

According to one or more embodiments, a fiber manufacturing apparatus includes: a fiber manufacturing portion including a first operation unit including a first operation surface to which a polymer solution is applied, wherein the first operation unit is driven such that the first operation surface repeatedly contacts and is spaced apart from a second operation surface facing the first operation surface, so that a fiber is manufactured between the first operation surface and the second operation surface; and a fiber collecting portion configured to collect the fiber manufactured between the first operation surface and the second operation surface.

The first operation unit may be configured to accommodate the polymer solution inside thereof and discharge the accommodated polymer solution via the first operation surface.

The fiber manufacturing apparatus may further include a polymer solution supply portion configured to supply the polymer solution to the first operation surface or the second operation surface.

The polymer solution supply portion may be configured to supply the polymer solution into the first operation unit.

The polymer solution supply portion may include: one or more reservoirs configured to store the polymer solution; and a solution pipe configured to guide the polymer solution from the one or more reservoirs into the first operation unit.

One or more via holes, through which the accommodated polymer solution is discharged, may be formed in the first operation surface.

The first operation unit may further include a discharge member disposed on the first operation surface and including a porous material.

The fiber collecting portion may be configured to move between the first operation surface and the second operation surface, when the first operation surface and the second operation surface are spaced apart from each other by a distance that is equal to or greater than a certain distance.

The fiber collecting portion may include a collecting surface on which the fiber is mounted, wherein the collecting surface is configured to move between the first operation surface and the second operation surface via a linear reciprocating motion.

The fiber collecting portion may include: a shaft member disposed apart from the fiber manufacturing portion by a certain distance; and one or more rotating members including a collecting surface on which the fiber is mounted and configured to rotate based on the shaft member to pass between the first operation surface and the second operation surface.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

The present disclosure may be variously modified and may have various embodiments, and example embodiments will be illustrated in the accompanying drawings and described in detail in the detailed description. Effects and characteristics of the disclosure and methods of achieving the effects and the characteristics of the disclosure will become apparent with reference to the example embodiments described in detail, together with the drawings. However, the disclosure is not limited to the embodiments described hereinafter, and may include various embodiments.

Hereinafter, the example embodiments will be described in detail, with reference to the accompanying drawings. Like reference numerals refer to like elements throughout, and repeated descriptions thereof will not be given. Expressions such as "at least one of," when preceding a list of elements, modify the entire list of elements and do not modify the individual elements of the list.

It will be understood that although the terms "first," "second," etc. may be used herein to describe various components, these components should not be limited by these terms. These components are only used to distinguish one component from another.

As used herein, the singular forms "a," "an," and "the" are intended to include the plural forms as well, unless the context clearly indicates otherwise.

It will be further understood that the terms "comprises" and/or "comprising" used herein specify the presence of stated features or components, but do not preclude the presence or addition of one or more other features or components.

It will be understood that when a layer, region, or component is referred to as being "formed on," another layer, region, or component, it can be directly or indirectly formed on the other layer, region, or component. That is, for example, intervening layers, regions, or components may be present.

Sizes of elements in the drawings may be exaggerated for convenience of explanation. In other words, since sizes and thicknesses of components in the drawings are arbitrarily illustrated for convenience of explanation, the following embodiments are not limited thereto.

When a certain embodiment may be implemented differently, a specific process order may be performed differently from the described order. For example, two consecutively described processes may be performed substantially at the same time or performed in an order opposite to the described order.

In embodiments hereinafter, it will be understood that when an element, such as a layer, a region, or a substrate, is referred to as being "connected to" or "coupled to" another element, it may be directly connected or coupled to the other element or intervening elements may be present. For example, in this specification, when an element, such as a layer, a region, or a substrate, is referred to as being "electrically connected to" or "electrically coupled to" another element, it may be directly electrically connected or coupled to the other element or it may be indirectly electrically connected or coupled to the other element with intervening elements therebetween.

Figure 1:
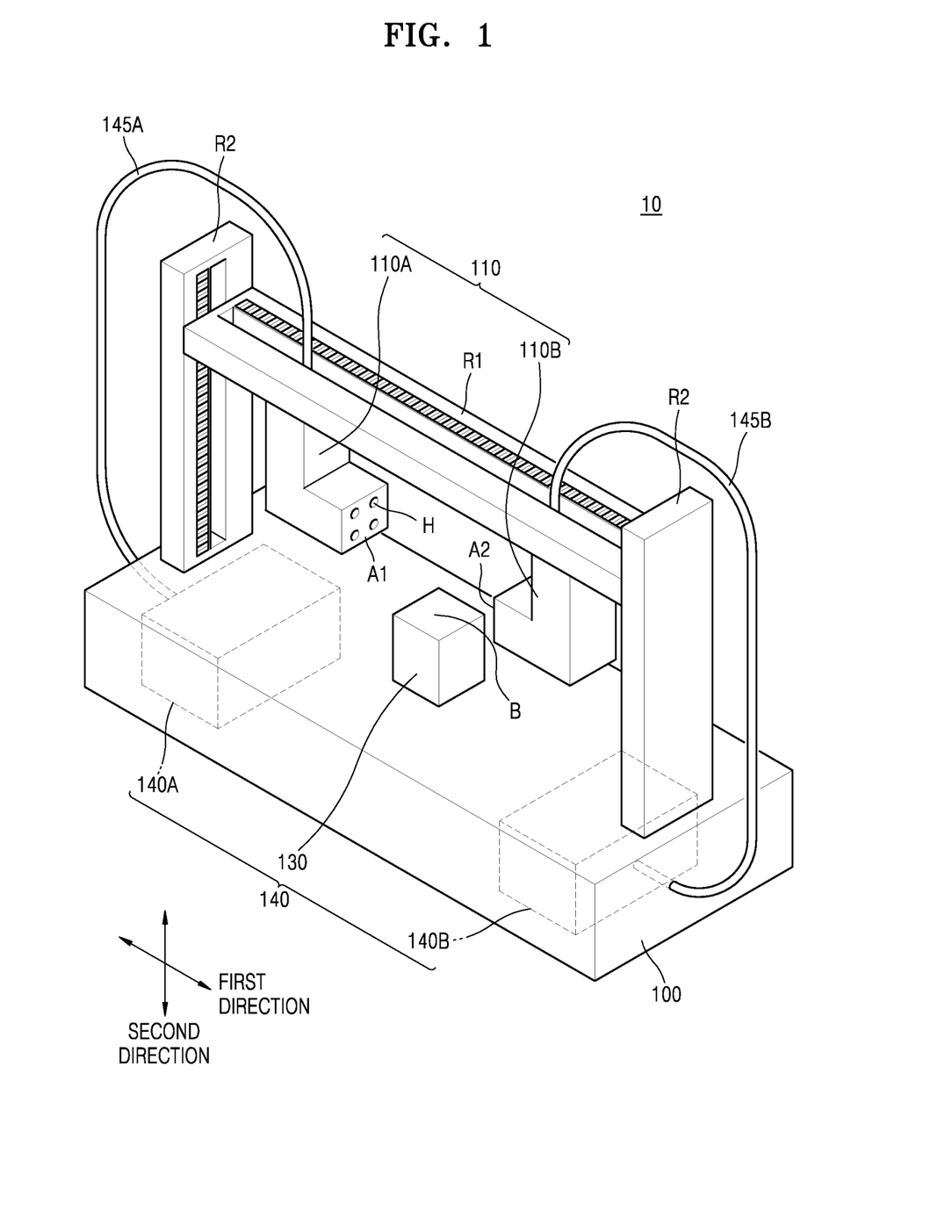
FIG. 1 is a schematic conceptual view of a fiber manufacturing apparatus according to an embodiment.
Figure 2:
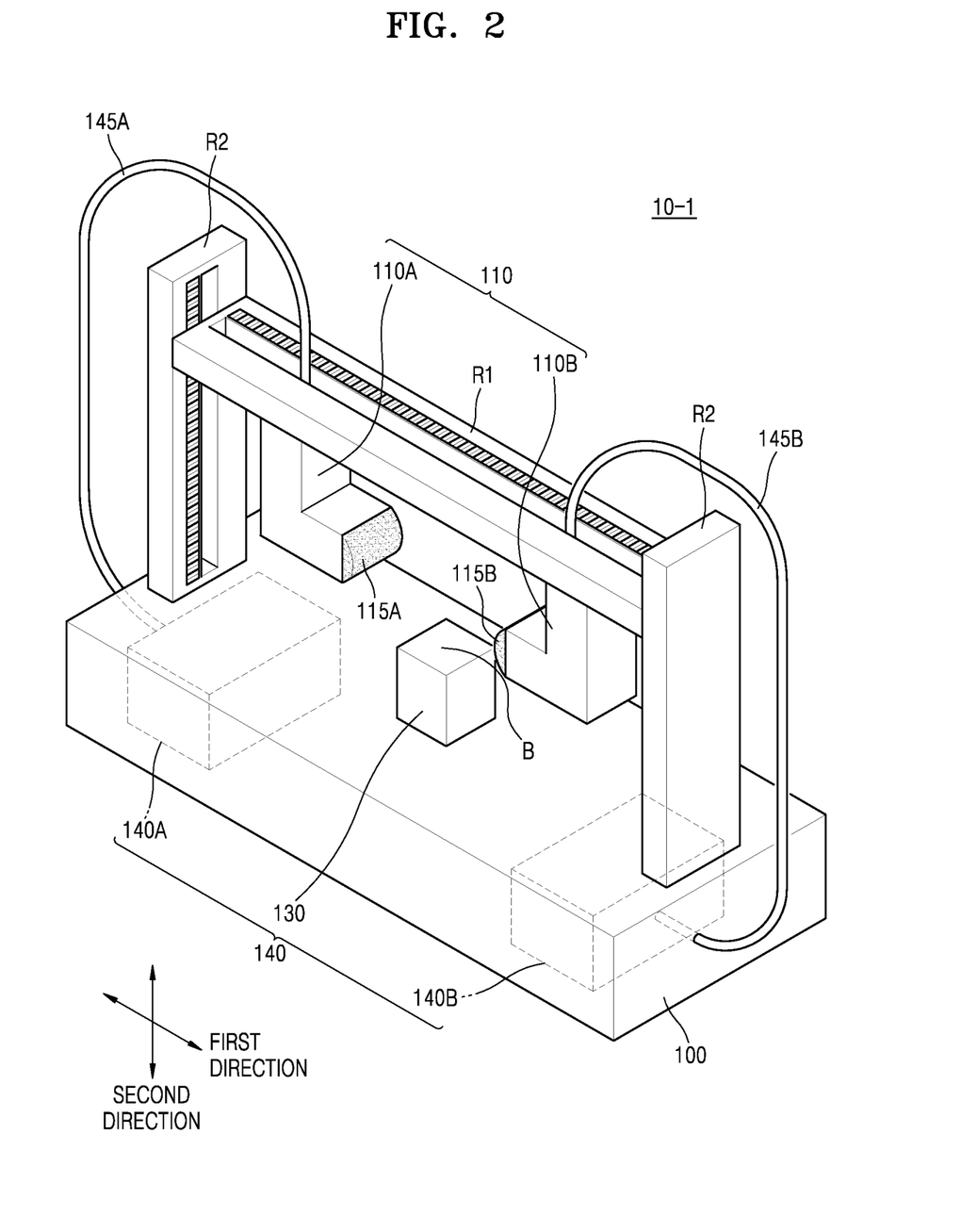
FIG. 2 is a schematic conceptual view of a fiber manufacturing apparatus, according to another embodiment.

FIG. 1 is a schematic conceptual view of a fiber manufacturing apparatus 10 according to an embodiment, and FIG. 2 is a schematic conceptual view of a fiber manufacturing apparatus 10-1 according to another embodiment.

Referring to FIGS. 1 and 2, the fiber manufacturing apparatus 10 according to an embodiment may include a fiber manufacturing portion 110, a fiber collecting portion 130, and a polymer solution supply portion 140.

Here, a fiber may be a vegetable protein-based fiber manufactured using a polymer solution having viscosity. However, embodiments are not limited thereto, and the fiber manufacturing apparatus 10 according to an embodiment may manufacture various types of fibers, which may be manufactured by using the polymer solution having viscosity.

Here, polymer materials included in the polymer solution may include at least one selected from the group consisting of polypropylene, polyethylene, polystyrene, polyethyleneoxide, polyethylene terephthalate, polybutylene terephthalate, polyethylene naphthalate, poly-m-phenylene terephthalate, poly-p-phenylene isophthalate, polyfluorine vinylidene, polyfluorine vinylidene-hexafluoropropylene copolymer, polyvinyl chloride, poly vinylidene chloride-acrylate copolymer, polyacrylonitrile, polyacrylonitrile-methacrylate copolymer, polycarbonate, polyarylate, polyester carbonate, nylon, aramid, polycaprolactone, polylactic acid, polyglycol acid, collagen, polyhydroxybutyric acid, polyvinyl acetate, and polypeptide. However, the embodiments are not limited thereto.

Also, a solvent may include at least one selected from the group consisting of methanol, ethanol, 1-propanol, 2-propanol, hexafluoroisopropanol, tetraethylene glycol, triethylene glycol, dibenzyl alcohol, 1,3-dioxolane, 1,4-dioxane, methyl ethyl ketone, methyl isobutyl ketone, methyl-n-hexyl ketone, methyl-n-propyl ketone, diisopropyl ketone, diisobutyl ketone, acetone, hexafluoroacetone, phenol, formic acid, methyl formic acid, ethyl formic acid, propyl formic acid, methyl benzoic acid, ethyl benzoic acid, propyl benzoic acid, methyl acetate, ethyl acetate, propyl acetate, dimethyl phthalic acid, diethyl phthalic acid, dipropyl phthalic acid, methyl chloride, ethyl chloride, methylene chloride, chloroform, o-chlorotoluene, p-chlorotoluene, carbon tetrachloride, 1,1-dichloroethane, 1,2-dichloroethane, trichloroethane, dichloropropane, dibromoethane, dibromopropane, methyl bromide, ethyl bromide, propyl bromide, acetic acid, benzene, toluene, hexane, cyclohexane, cyclohexanone, cyclo pentane, o-xylene, p-xylene, m-xylene, acetonitrile, tetrahydrofuran, N,N-dimethyl formamide, pyridine, and water. However, the embodiments are not limited thereto.

Also, an inorganic solid material may be mixed in the polymer solution. Here, the inorganic solid material may include oxide, carbide, nitride, boride, silicide, fluoride, and sulfide. According to an embodiment, for the sake of durability, processability, etc., the polymer solution may include oxide. The oxide may include at least one selected from the group consisting of $Al_2O_3$, $SiO_2$, $TiO_2$, $Li_2O$, $Na_2O$, $MgO$, $CaO$, $SrO$, $BaO$, $B_2O_3$, $P_2O_5$, $SnO_2$, $ZrO_2$, $K_2O$, $Cs_2O$, $ZnO$, $Sb_2O_3$, $As_2O_3$, $CeO_2$, $V_2O_5$, $Cr_2O_3$, $MnO$, $Fe_2O_3$, $CoO$, $NiO$, $Y_2O_3$, $Lu_2O_3$, $Yb_2O_3$, $HfO_2$, and $Nb_2O_5$. However, the embodiments are not limited thereto.

The fiber manufacturing portion 110 may include a first operation unit 110A and a second operation unit 110B. The first operation unit 110A may include a first operation surface A1 and the second operation unit 110B may include a second operation surface A2. Here, as illustrated in FIG. 1, the first operation unit 110A and the second operation unit 110B may be arranged such that the first operation surface A1 and the second operation surface A2 face each other. In the fiber manufacturing portion 110, the first operation unit 110A or the second operation unit 110B may move in a direction via a first guide rail R1. The fiber manufacturing portion 110 may further include a driving unit (not shown) including a motor or an actuator, which may move the first operation unit 110A or the second operation unit 110B to periodically perform a linear reciprocating motion via the first guide rail R1.

Any one of the first operation surface A1 and the second operation surface A2 may include the polymer solution having viscosity. The fiber manufacturing portion 110 may manufacture a fiber between the first operation surface A1 and the second operation surface A2, via a reciprocating motion of at least one of the first operation unit 110A and the second operation unit 110B. In other words, the first operation surface A1 and the second operation surface A2 of the fiber manufacturing portion 110 may contact each other and then may be spaced apart from each other, with the polymer solution therebetween, so that a tensile force is applied to the polymer solution, and thus, a fiber may be manufactured. A detailed operation method of the fiber manufacturing apparatus 10 will be described below.

Meanwhile, at least one of the first operation unit 110A and the second operation unit 110B may accommodate the polymer solution inside thereof and may discharge the accommodated polymer solution via the first operation surface A1 or the second operation surface A2. The first operation unit 110A or the second operation unit 110B may include a cavity to accommodate the polymer solution inside thereof and may discharge the polymer solution through a via hole H formed in the first operation surface A1 or the second operation surface A2. The via hole H formed in the first operation surface A1 or the second operation surface A2 may include one or more via holes H.

Referring to FIG. 2, according to another embodiment, at least one of the first operation unit 110A and the second operation unit 110B may include a discharge member 115A and 115B arranged on the first operation surface A1 or the second operation surface A2. It is illustrated in FIG. 2 that the first operation unit 110A and the second operation unit 110B include a first discharge member 115A and a second discharge member 115B, respectively, according to an embodiment. However, the disclosure is not limited thereto.

The first discharge member 115A and the second discharge member 115B may include a porous material, such as sponge. After the polymer solution is discharged from the first operation unit 110A or the second operation unit 110B through the via hole H, the polymer solution may be soaked into the first discharge member 115A or the second discharge member 115B. The first discharge member 115A and the second discharge member 115B may have elasticity, and thus, when the first discharge member 115A and the second discharge member 115B contact each other and press each other, the polymer solution soaked into the first discharge member 115A or the second discharge member 115B may be discharged to the outside. The first operation unit 110A and the second operation unit 110B of the fiber manufacturing portion 110 may more densely contact each other via the first discharge member 115A and the second discharge member 115B and may uniformly manufacture the fiber.

Meanwhile, the fiber collecting portion 130 may collect the fiber manufactured between the first operation surface A1 and the second operation surface A2. According to an embodiment, when the first operation surface A1 and the second operation surface A2 are spaced apart from each other by a distance that is equal to or greater than a certain distance, the fiber collecting portion 130 may move between the first operation unit 110A and the second operation unit 110B to collect the fiber. According to another embodiment, while a location of the fiber collecting portion 130 may be fixed, the fiber manufacturing portion 110 may allow the first operation unit 110A and the second operation unit 110B to be spaced apart from each other and may move to the fiber collecting portion 130 to collect the fiber.

The fiber collecting portion 130 may include a collecting surface B, on which the fiber is mounted. When the fiber collecting portion 130 moves between the first operation unit 110A and the second operation unit 110B, the fiber collecting portion 130 may mount, on the collecting surface B, the fiber manufactured between the first operation unit 110A and the second operation unit 110B and in the air.

The polymer solution supply portion 140 may supply the polymer solution to any one of the first operation surface A1 of the first operation unit 110A and the second operation surface A2 of the second operation unit 110B. According to an embodiment, the polymer solution supply portion 140 may include a spreading device configured to spread the polymer solution to the first operation surface A1 or the second operation surface A2. According to another embodiment, the polymer solution supply portion 140 may supply the polymer solution into at least one of the first operation unit 110A and the second operation unit 110B. According to the disclosure, methods of supplying the polymer solution are not limited. However, for convenience of explanation, the case in which the polymer solution supply portion 140 supplies the polymer solution into the first operation unit 110A or the second operation unit 110B will be mainly described.

According to an embodiment, the polymer solution supply portion 140 may include a reservoir configured to store the polymer solution, which may supply the polymer solution to both of the first operation unit 110A and the second operation unit 110B. Here, the reservoir may be arranged in a housing 100 arranged below the fiber manufacturing portion 110. According to another embodiment, the polymer solution supply portion 140 may include a first reservoir 140A and a second reservoir 140B, which may supply the polymer solution to the first operation unit 110A and the second operation unit 110B, respectively. Here, the polymer solution supply portion 140 may include a first solution pipe 145A configured to guide the polymer solution from the first reservoir 140A to the first operation unit 110A, and a second solution pipe 145B configured to guide the polymer solution from the second reservoir 140B to the second operation unit 110B. Also, although not illustrated, the polymer solution supply portion 140 may further include a pump or a valve forming a flow of the polymer solution stored in the first reservoir 140A and the second reservoir 140B.

Figure 3:
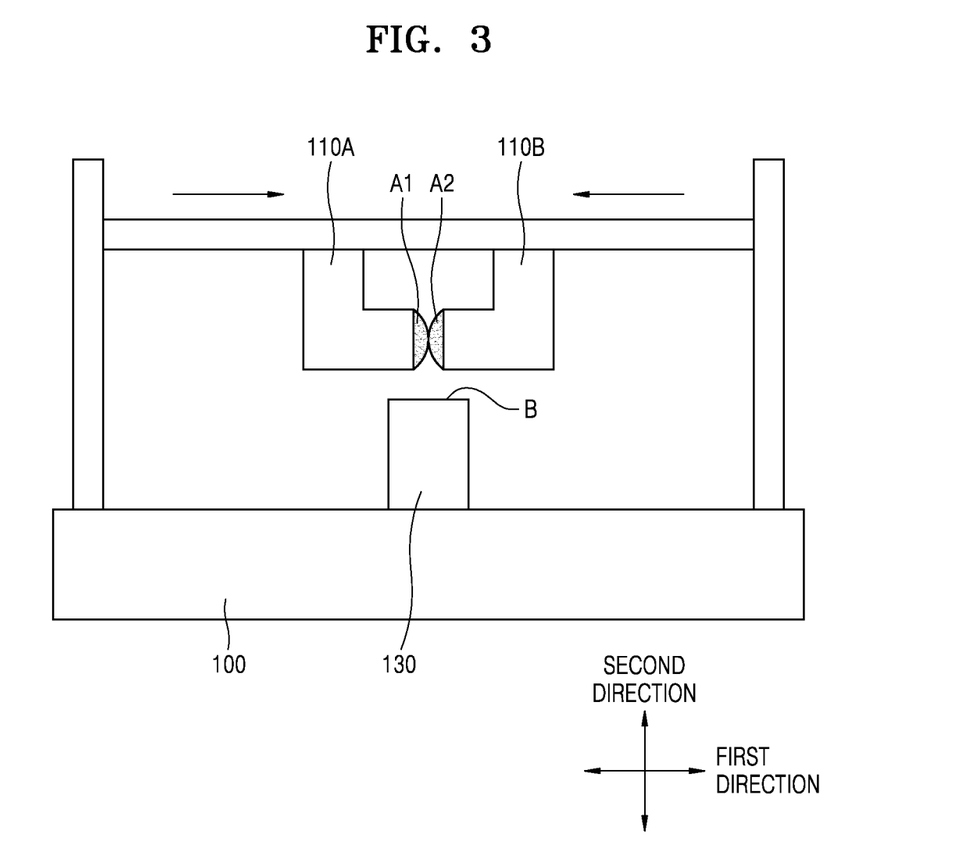
FIGS. 3 and 4 are example views for describing an operation of a fiber manufacturing apparatus, according to an embodiment.
Figure 4:
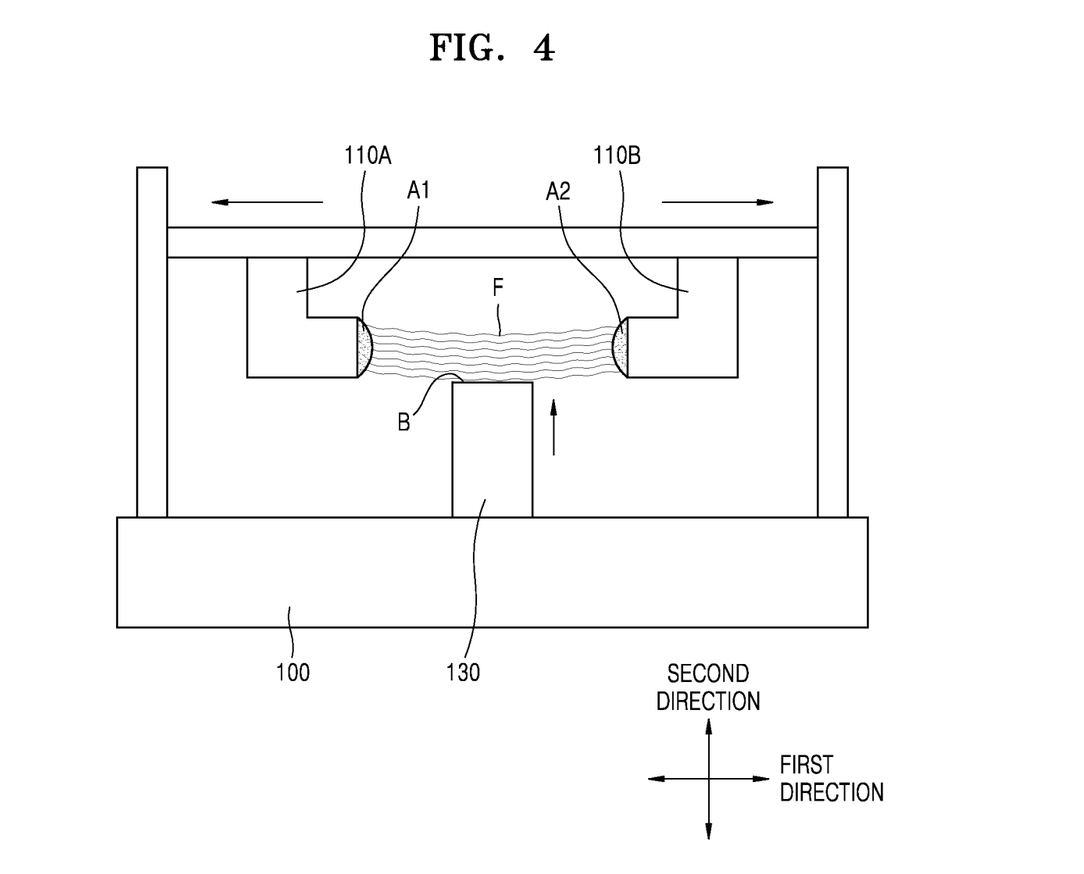

FIGS. 3 and 4 are example views for describing an operation of the fiber manufacturing apparatus 10, according to an embodiment.

Referring to FIG. 3, the fiber manufacturing apparatus 10 may move the first operation unit 110A or the second operation unit 110B in a first direction so that the first operation surface A1 and the second operation surface A2 contact each other. Here, the polymer solution is applied to at least one of the first operation surface A1 and the second operation surface A2, and thus, when the first operation surface A1 and the second operation surface A2 contact each other, the polymer solution is between the first operation surface A1 and the second operation surface A2.

Next, referring to FIG. 4, the fiber manufacturing apparatus 10 may move the first operation unit 110A and the second operation unit 110B to be apart from each other. Here, a fiber F may be manufactured between the first operation surface A1 and the second operation surface A2. In other words, the polymer solution between the first operation surface A1 and the second operation surface A2 may extend due to a tensile force when the first operation unit 110A and the second operation unit 110B become spaced apart from each other, and thus, the polymer solution may be formed in a shape of the fiber F. The fiber F may be arranged between the first operation unit 110A and the second operation unit 110B, and the fiber manufacturing apparatus 10 may move the fiber collecting portion 130 in a second direction, which is different from the first direction, so that the fiber F is mounted on the collecting surface B. The fiber manufacturing apparatus 10 may repeat these operations to obtain the vegetable protein-based fiber F.

According to another embodiment, while the fiber collecting portion 130 is fixed, heights of the first operation unit 110A and the second operation unit 110B may be adjusted to mount the fiber F on the collecting surface B of the fiber collecting portion 130.

Meanwhile, although not illustrated, the fiber manufacturing apparatus 10 may further include a controller (not shown), which is configured to control the first operation unit 110A and the second operation unit 110B to periodically and repeatedly contact each other and become spaced apart from each other. Also, the controller (not shown) may control the fiber collecting portion 130 to repeatedly move between the first operation unit 110A and the second operation unit 110B in correspondence to the cycle of the repeated motion of the first operation unit 110A and the second operation unit 110B. However, the disclosure is not limited thereto, and the first operation unit 110A and the second operation unit 110B may not have to periodically contact each other or become spaced apart from each other.

The first operation unit 110A and the second operation unit 110B may non-periodically perform a reciprocating motion, and the movement of the fiber collecting portion 130 may be controlled in correspondence to the non-periodical reciprocating motion of the first operation unit 110A and the second operation unit 110B. According to necessity, the fiber manufacturing apparatus 10 may further include a distance sensor (not shown) configured to measure a distance between the first operation unit 110A and the second operation unit 110B. The controller (not shown) may measure a distance between the first operation unit 110A and the second operation unit 110B, the distance being sensed by the distance sensor, and when the distance is equal to or greater than a pre-defined distance, may move the fiber collecting portion 130 between the first operation unit 110A and the second operation unit 110B.

Here, the controller may include all types of devices configured to process data, such as a processor. Here, a "processor" may denote, for example, a data processing device embedded in hardware and having physically structured circuits for executing functions indicated by code or commands included in a program. Examples of the data processing device embedded in hardware may include a microprocessor, a central processing unit (CPU), a processor core, a multiprocessor, an application-specific integrated circuit (ASIC), a field programmable gate array (FPGA), etc., but the present disclosure is not limited thereto.

According to another embodiment, the fiber manufacturing apparatus 10 may further include a database portion (not shown) configured to store properties based on types of the polymer solution. The polymer solution may be in a liquid state or a gel state, and a degree of viscosity, elasticity, or viscoelasticity of the polymer solution may be stored in the database portion. Here, a controller (not shown) may control a periodical or non-periodical reciprocating motion of the first operation unit 110A and the second operation unit 110B or may control a moving speed or a driving cycle of the fiber collecting portion 130, based on the properties of the polymer solution.

According to another embodiment, the fiber manufacturing apparatus 10 may further include a heating portion (not shown) arranged in the polymer solution supply portion 140 and configured to supply heat energy to the polymer solution. The heating portion may control a temperature of the polymer solution, thereby changing the degree of viscosity or viscoelasticity of the polymer solution, which is used as a material. Also, the polymer solution supply portion 140 may further include a temperature sensor (not shown), a viscosity measuring portion (not shown), or a viscoelasticity measuring portion (not shown), and a controller (not shown) may control an operation of the heating portion based on a measurement signal measured from the temperature sensor, the viscosity measuring portion, or the viscoelasticity measuring portion.

According to another embodiment, the fiber manufacturing apparatus 10 may further include a chamber (not shown), in which the described components are arranged, and a temperature adjusting device (not shown) configured to control a temperature of the chamber. The temperature adjusting device may control a temperature in the chamber, thereby curing or hardening the polymer solution discharged from the first operation surface A1 or the second operation surface A2. The disclosure is not limited thereto, and the fiber manufacturing apparatus 10 may include a fan portion (not shown) arranged adjacent to the first operation unit 110A and the second operation unit 110B and configured to control a temperature between the first operation surface A1 and the second operation surface A2.

Figure 5:
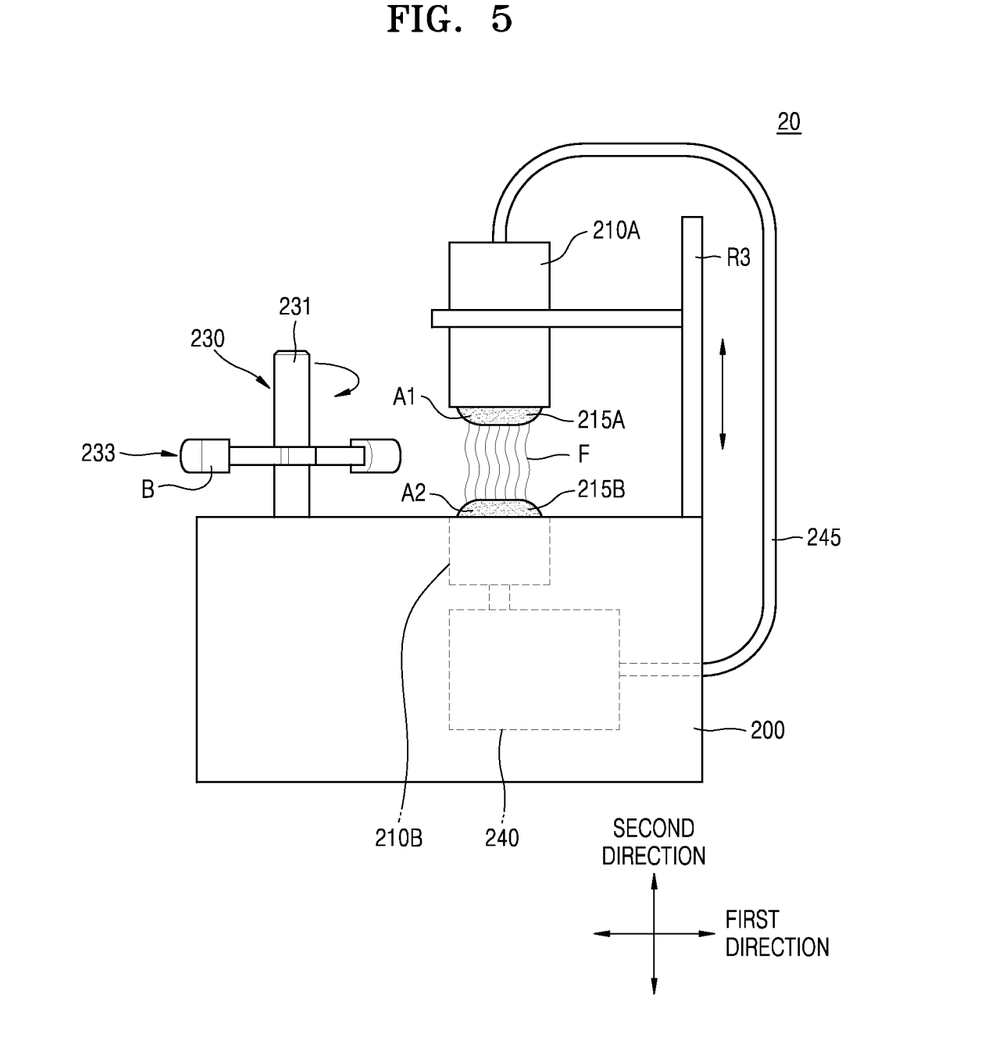
FIG. 5 is a schematic conceptual view of a fiber manufacturing apparatus according to another embodiment.

FIG. 5 is a schematic conceptual view of a fiber manufacturing apparatus 20 according to another embodiment.

Referring to FIG. 5, the fiber manufacturing apparatus 20 may include a fiber manufacturing portion 210A and 210B, a fiber collecting portion 230, and a polymer solution supply portion 240. Hereinafter, for convenience of explanation, repeated descriptions will not be given.

The fiber manufacturing portion 210 may include a first operation unit 210A including a first operation surface A1. The fiber manufacturing portion 210 may drive the first operation unit 210A such that the first operation surface A1 repeatedly contacts and becomes spaced apart from a second operation surface A2 facing the first operation surface A1. The second operation surface A2 may be an area of a surface of a housing 200. Here, the fiber manufacturing portion 210 may allow a second operation unit 210B to be arranged below the second operation surface A2 and may discharge a polymer solution via the second operation surface A2. Meanwhile, the fiber manufacturing portion 210 according to another embodiment may move the first operation unit 210A in a second direction, which is a gravitational direction. Here, the first operation unit 210A may move through a third guide rail R3, via a motor or an actuator.

The fiber manufacturing apparatus 20 may further include a first discharge member 215A arranged on the first operation surface A1 and a second discharge member 215B arranged on the second operation surface A2. The first discharge member 215A and the second discharge member 215B may include a porous material having elasticity, such as sponge.

The fiber collecting portion 230 may include a shaft member 231 arranged apart from the fiber manufacturing portion 210 by a certain distance, and a rotation member 233 connected to the shaft member 231 and rotating around the shaft member 231.

The rotation member 233 may include the collecting surface B, on which a fiber is mounted. The rotation member 233 may rotate based on the shaft member 231 to pass between the first operation surface A1 and the second operation surface A2. The fiber collecting portion 230 may include one or more rotation members 233 to collect the fiber based on a driving cycle of the first operation unit 210A. For example, the fiber collecting portion 230 may include two rotation members 233, as illustrated in FIG. 5. Meanwhile, a controller (not shown) may control a rotation speed of the rotation member 233 in correspondence to the driving cycle of the first operation unit 210A.

The polymer solution supply portion 240 may supply a polymer solution to at least one of the first operation surface A1 and the second operation surface A2. According to an embodiment, the polymer solution supply portion 240 may include a solution pipe 245 configured to guide the polymer solution into the first operation unit 210A, and although not shown, may allow a flow of the polymer solution to the first operation unit 210A, via a pump or a valve.

As described above, according to the one or more of the above embodiments, the fiber manufacturing apparatuses 10, 10-1, and 20 may apply a tensile force to the polymer solution having viscosity, by using the fiber manufacturing portions 110 and 210, to manufacture a vegetable protein-based fiber. Accordingly, a viscoelastic polymer may be easily thinned, and structures of the fiber manufacturing apparatuses 10, 10-1, and 20 may be simplified, and thus, time and cost for manufacturing the vegetable protein-based fiber may be reduced.

The fiber manufactured by the fiber manufacturing apparatuses 10, 10-1, and 20 according to the embodiments may be used not only as a material for synthetic meat, but also as a material of a capsule, etc., which is a three-dimensional material. For the fiber used as the material of a capsule, a fiber including the viscous material of the fiber manufacturing apparatuses 10, 10-2, and 20 may be used, or a viscous material may be further added to the polymer solution and mixed in the polymer solution, and the polymer solution in which the viscous material is further added and mixed may be two-dimensionally or three-dimensionally re-arranged and manufactured as a capsule.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the disclosure as defined by the following claims.

What is claimed is:

1. A fiber manufacturing apparatus comprising:
   a fiber manufacturing portion comprising a first operation unit comprising a first operation surface and a second operation unit comprising a second operation surface facing the first operation surface, wherein at least one of the first operation unit and the second operation unit performs a reciprocating motion to manufacture a fiber between the first operation surface and the second operation surface; and
   a fiber collecting portion configured to collect the fiber manufactured between the first operation surface and the second operation surface,
   wherein one or more via holes, through which an accommodated polymer solution is discharged, are formed in the at least one of the first operation surface and the second operation surface,
   wherein at least one of the first operation unit and the second operation unit further comprises a discharge member disposed on the first operation surface or the second operation surface to cover the via holes and comprising a porous material having elasticity, wherein the discharge member is configured to accommodate the polymer solution discharged from the via holes.

2. The fiber manufacturing apparatus of claim 1, wherein the at least one of the first operation unit and the second operation unit is configured to accommodate the polymer solution inside thereof and discharge the accommodated polymer solution via the first operation surface or the second operation surface.

3. The fiber manufacturing apparatus of claim 2, further comprising a polymer solution supply portion configured to supply the polymer solution to the at least one of the first operation surface and the second operation surface.

4. The fiber manufacturing apparatus of claim 3, wherein the polymer solution supply portion is further configured to supply the polymer solution into the at least one of the first operation unit and the second operation unit.

5. The fiber manufacturing apparatus of claim 4, wherein the polymer solution supply portion comprises:
   one or more reservoirs configured to store the polymer solution; and
   a solution pipe configured to guide the polymer solution from the one or more reservoirs into the at least one of the first operation unit and the second operation unit.

6. The fiber manufacturing apparatus of claim 1, wherein the fiber collecting portion is configured to move between the first operation unit and the second operation unit, when the first operation unit and the second operation unit are spaced apart from each other by a distance that is equal to or greater than a certain distance.

7. The fiber manufacturing apparatus of claim 1, wherein the fiber collecting portion comprises a collecting surface on which the fiber is mounted, wherein the collecting surface is configured to move between the first operation unit and the second operation unit via a linear reciprocating motion.

8. The fiber manufacturing apparatus of claim 1, wherein the fiber collecting portion comprises:
   a shaft member disposed apart from the fiber manufacturing portion by a certain distance; and
   one or more rotating members comprising a collecting surface on which the fiber is mounted and configured to rotate based on the shaft member to pass between the first operation unit and the second operation unit.

9. A fiber manufacturing apparatus comprising:
   a fiber manufacturing portion comprising a first operation unit comprising a first operation surface to which a polymer solution is applied, wherein the first operation unit is driven such that the first operation surface repeatedly contacts and is spaced apart from a second operation surface facing the first operation surface, so that a fiber is manufactured between the first operation surface and the second operation surface; and
   a fiber collecting portion configured to collect the fiber manufactured between the first operation surface and the second operation surface,
   wherein one or more via holes, through which the accommodated polymer solution is discharged, are formed in the first operation surface,
   wherein the first operation unit further comprises a discharge member disposed on the first operation surface to cover the via holes and comprising a porous material having elasticity,
   wherein the discharge member is configured to accommodate the polymer solution discharged from the via holes.

10. The fiber manufacturing apparatus of claim 9, wherein the first operation unit is configured to accommodate the polymer solution inside thereof and discharge the accommodated polymer solution via the first operation surface.

11. The fiber manufacturing apparatus of claim 9, further comprising a polymer solution supply portion configured to supply the polymer solution to the first operation surface or the second operation surface.

12. The fiber manufacturing apparatus of claim 11, wherein the polymer solution supply portion is configured to supply the polymer solution into the first operation unit.

13. The fiber manufacturing apparatus of claim 12, wherein the polymer solution supply portion comprises:
   one or more reservoirs configured to store the polymer solution; and
   a solution pipe configured to guide the polymer solution from the one or more reservoirs into the first operation unit.

14. The fiber manufacturing apparatus of claim 9, wherein the fiber collecting portion is configured to move between the first operation surface and the second operation surface, when the first operation surface and the second operation surface are spaced apart from each other by a distance that is equal to or greater than a certain distance.

15. The fiber manufacturing apparatus of claim 9, wherein the fiber collecting portion comprises a collecting surface on which the fiber is mounted, wherein the collecting surface is configured to move between the first operation surface and the second operation surface via a linear reciprocating motion.

16. The fiber manufacturing apparatus of claim 9, wherein the fiber collecting portion comprises:
   a shaft member disposed apart from the fiber manufacturing portion by a certain distance; and
   one or more rotating members comprising a collecting surface on which the fiber is mounted and configured to rotate based on the shaft member to pass between the first operation surface and the second operation surface.

* * * * *